United States Patent [19]

Fiori, Jr.

[11] Patent Number: 4,777,436

[45] Date of Patent: Oct. 11, 1988

[54] INDUCTANCE COIL SENSOR

[75] Inventor: David Fiori, Jr., Yardley, Pa.

[73] Assignee: Sensor Technologies, Inc., Penndel, Pa.

[21] Appl. No.: 700,295

[22] Filed: Feb. 11, 1985

[51] Int. Cl.[4] .......................... G01B 7/14; H01F 21/02
[52] U.S. Cl. ...................................... 324/208; 336/79; 336/123; 336/130
[58] Field of Search ........................ 336/75, 77, 79, 87, 336/119, 120, 123, 130, 135, 200, 232, 132, 134, 136, 121, 122; 324/173, 174, 207, 208; 318/653

[56] References Cited

U.S. PATENT DOCUMENTS

| | | | |
|---|---|---|---|
| 1,558,473 | 10/1925 | Gordon | 336/79 |
| 2,334,584 | 11/1943 | Rich | 336/192 X |
| 2,341,345 | 2/1944 | Van Billiard | 336/79 X |
| 2,341,346 | 2/1944 | Summerhayes, Jr. | 336/79 X |
| 2,468,126 | 4/1949 | Silver | 336/79 |
| 2,511,897 | 6/1950 | Booth | 336/75 X |
| 2,629,860 | 2/1953 | Chesus et al. | 336/200 X |
| 2,805,398 | 9/1957 | Albersheim | 336/87 X |
| 3,090,933 | 5/1963 | Henry-Baudot | 336/120 |
| 3,105,212 | 9/1963 | Schwartz | 336/87 |
| 3,219,956 | 11/1965 | Newell et al. | 336/87 X |
| 3,409,805 | 11/1968 | Whipple et al. | 336/200 X |
| 3,819,025 | 6/1974 | Fushida et al. | 336/135 X |
| 4,253,079 | 2/1981 | Brosh | 336/200 X |
| 4,409,529 | 10/1983 | Basford et al. | 318/653 |
| 4,507,638 | 3/1985 | Brosh | 336/130 X |
| 4,663,589 | 5/1987 | Fiori, Jr. | 324/208 |

FOREIGN PATENT DOCUMENTS 783549 9/1957 United Kingdom ............... 336/135

*Primary Examiner*—Thomas J. Kozma
*Attorney, Agent, or Firm*—Ratner & Prestia

[57] ABSTRACT

An inductance coil sensor in which a rotating spoiler (46) alters the inductance of a stationary coil (1230/1432) having two parts (12a, 12b; 30a, 30b/14a, 14b; 32a, 32b) disposed on opposite sides of the spoiler. Changes in inductance of the stationary coil are sensed to develop an indication of the rotary movement of the spoiler which, in turn, represents changes in the parameter being monitored. By locating one part of the stationary coil above the spoiler and one part below the spoiler, compensation is provided for undesired movements of the spoiler along its rotation axis.

22 Claims, 2 Drawing Sheets

INDUCTANCE COIL SENSOR

DESCRIPTION

1. Technical Field

The present invention relates, in general, to sensors which develop signals corresponding to variations in a parameter being monitored. The invention is concerned particularly with a planar inductance coil sensor which has an inductance which varies as the parameter being sensed varies.

2. Background Art

Non-contacting sensors are well-known. Such sensors may include one or more stationary inductance coils and a movable member which moves in the field of the stationary inductance coils in accordance with the parameter being monitored to change the induction of the stationary coils. Non-contacting sensors are especially useful because they are not subject to wearing as are those sensors in which the moving and stationary parts are in contact. For example, in a simple potentiometer having a wiper blade which moves along a resistance winding, the constant moving, frictional contact between the wiper blade and the resistance winding will cause wear of one or both parts.

Various differently configured non-contacting sensors have been developed in the past. One of these is a planar coil sensor which can be produced by printed circuit techniques. Among the advantages of planar coil sensors are ease of manufacture, relatively low cost, and small size.

In one known planar coil sensor, the moving part, sometimes referred to as a "spoiler", is mounted on a shaft for rotary movement into and out of the field of one or more stationary planar coils attached to an insulating board. The position of the spoiler, relative to the position of the stationary coil or coils, is set by the parameter being monitored and determines the change in inductance of the planar coil or coils. Changes in inductance, caused by the spoiler movement, are detected by electronic circuitry which, in turn, provides an output indication corresponding to changes in the parameter being monitored.

Many current-day applications of sensors require extremely accurate indications of the parameter being monitored. The particular planar coil sensor described above is subject to errors when the spoiler is displaced in a direction perpendicular to the the plane of the coil. This may be caused by slippage of the spoiler along its mounting shaft or by axial displacement of the shaft itself or by canting of the spoiler relative to its mounting shaft. Instead of altering the field of the planar coil by movement of the spoiler only within a prescribed plane, the spoiler can undergo different movements, which can have an adverse effect on the accuracy of the sensor.

DISCLOSURE OF THE INVENTION

Accordingly, it is an objective of the present invention to provide a new and improved inductance coil sensor.

It is another objective of the present invention to provide a new and improved inductance coil sensor in the form of a planar coil.

It is a further objective of the present invention to provide a planar coil inductance sensor which is accurate and reliable in operation.

These and other objectives are achieved, according to the present invention, by an inductance coil sensor which includes a first insulating board having a planar metal coil attached thereto and a second insulating board disposed parallel to the first insulating board and having a planar metal coil attached thereto. The planar metal coils are connected in a series. The invention also includes a movable planar metal member which is positioned between the two insulating boards and is disposed parallel to the boards. The invention further includes means for moving the movable planar metal member in its plane.

BRIEF DESCRIPTION OF THE DRAWINGS

Referring to the drawings.

BEST MODE OF CARRYING OUT THE INVENTION

Figure 1:
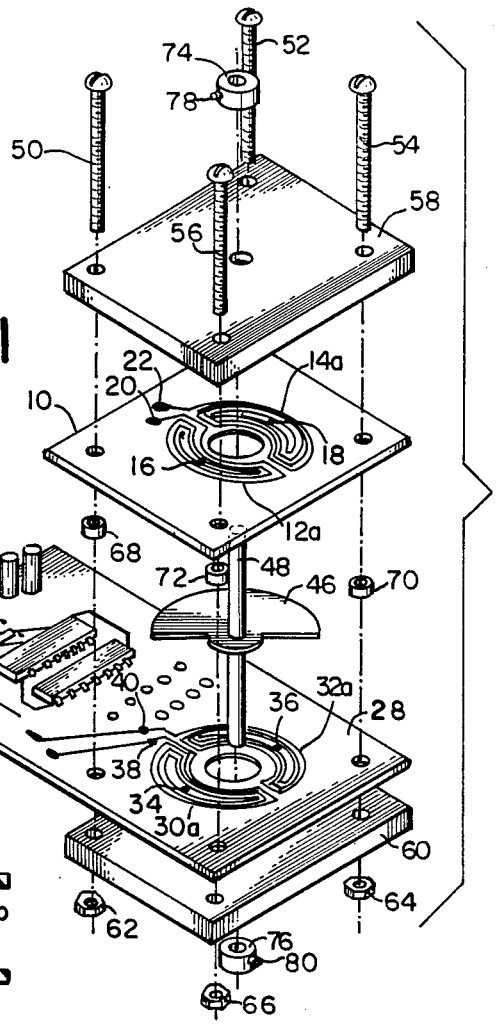
FIG. 1 is an exploded perspective view of a preferred embodiment of an inductance coil sensor constructed in accordance with the present invention.
Figure 2:
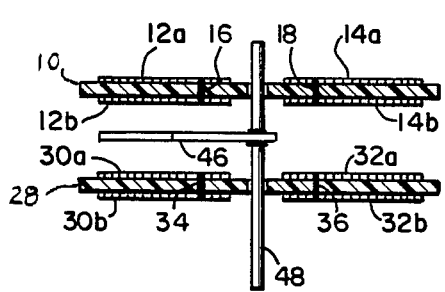
FIG. 2 is a sectional view of a portion of the FIG. 1 inductance coil sensor.
Figure 3:
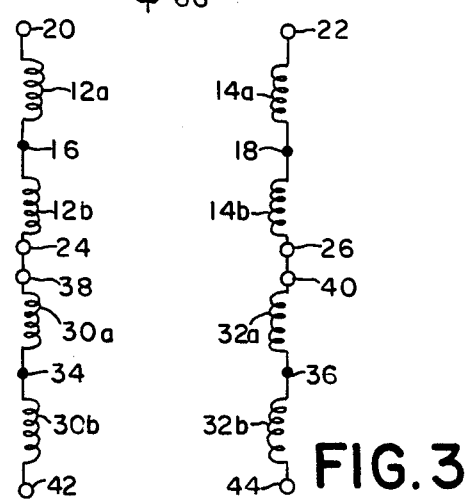
FIG. 3 is a schematic diagram showing the connections of the planar coils of the inductance coil sensor of FIGS. 1 and 2.

Referring to FIGS. 1, 2 and 3, an inductance coil sensor, constructed in accordance with the present invention, includes a first insulating board 10 having first and second planar metal coils 12a, 12b and 14a, 14b attached thereto.

Coils 12a, 12b and 14a, 14b may be formed by conventional printed circuit techniques with each having a generally semi-circular shape.

As shown most clearly in FIG. 2, coil part 12a is on the top surface of insulating board 10 and coil part 12b is on the bottom surface of insulating board 10. By means of a plated through-hole 16 which extends through insulating board 10, coil parts 12a and 12b are connected to form planar metal coil 12a, 12b. This is shown schematically in FIG. 3. In a similar manner, coil parts 14a and 14b, on the top and bottom surfaces, respectively, of insulating board 10, are connected by a plated through-hole 18 which extends through insulating board 10 to form planar metal coil 14a, 14b. Terminals 20 and 22 each define one end of the coils 12a, 12b and 14a, 14b, respectively, while terminals 24 and 26, shown only in FIG. 3, each define the other end of coils 12a, 12b and 14a, 14b respectively. Although coil parts 12a, 12b, 14a and 14b are shown as being generally semi-circular shapes so that adjacent coils form a generally circular shape, these coils, as well as the other coil parts to be described below, can have other shapes.

An inductance coil sensor, constructed in accordance with the present invention, also includes a second insulating board 28 having third and fourth planar metal coils 30a, 30b and 32a, 32b attached thereto. Coils 30a, 30b and 32a, 32b may be formed in the same way and arranged in a similar manner to coils 12a, 12b and 14a, 14b. Coil parts 30a and 30b, on the top and bottom surfaces, respectively, of insulating board 28, are connected by a plated through-hole 34 which extends through insulating board 28 to form planar metal coil 30a, 30b. Coil parts 32a and 32b, on the top and bottom surfaces, respectively, of insulating board 28, are connected by a plated through-hole 36 which extends through insulating board 28 to form planar metal coil 32a, 32b. Terminals 38 and 40 each define one end of coils 30a, 30b and 32a, 32b, respectively, while terminals 42 and 44, shown only in FIG. 3, each define the other ends of coils 30a, 30b and 32a, 32b.

The inductance coil sensor of the invention further includes means for connecting one of the coils on insulating board 10 in series with one of the coils on insulating board 28 and for connecting the other coil on insulating board 10 with the other coil on insulating board 28. The series connections of the coils is not shown in the exploded perspective view of FIG. 1 for the sake of clarity but are represented in the schematic diagram of FIG. 3 by the connection of terminals 24 and 38 and the connection of terminals 26 and 40. The series connection of coils 12a 12b and 30a, 30b will be referred to hereinafter as coil 1230 and the series connection of coils 14a, 14b and 32a, 32b will be referred to hereinafter as coil 1432.

Positioned between and spaced from insulating boards 10 and 28 is a movable planar metal member 46 which serves as a spoiler as it moves in the space bounded by the two insulating boards. Spoiler 46 is mounted on a shaft 48 which, in turn, is coupled to another rotating component (not shown), the movement of which represents the parameter being monitored. Shaft 48 is disposed perpendicular to the plane of spoiler 46. As the shaft turns in reponse to changes in the parameter being monitored, spoiler 46 moves in its plane between the spaced coils of coil 1230 (coils 12a, 12b and 30a, 30b) and the spaced coils of coil 1432 (14a, 14b and 32a, 32b). Although shown as a solid part having a generally semi-circular shape, spoiler 46 can be a wound or coiled article and can have a different shape.

As shown in FIG. 1, insulating board 28 may be arranged to carry electronic circuit components which make up the circuit which develops indications of changes in the parameter being monitored. This circuit will be considered in greater detail in connection with FIG. 4.

The various components form an assembly which is held together by a plurality of screws 50, 52, 54, and 56, extending between a pair of insulating blocks 58 an 60, and engaged by a plurality of mating nuts 62, 64, and 66. The nut associated with screw 52 is not shown in FIG. 1. Insulating board 10, carrying coils 12a, 12b and 14a, 14b, is spaced from insulating board 28, carrying coils 30a 30b and 32a, 32b, by means of a plurality of spacers 68, 70, and 72 through which screws 50, 54 and 56, respectively, pass. The spacer associated with screw 52 is not shown in FIG. 1. In this way, spoiler 46 can be spaced from the insulating boards and the coils carried by the insulating boards, so that there is no physical contact between the spoiler and the coils. The axial position of the spoiler, relative to insulating boards 10 and 28, can be set by a pair of collars 74 and 76 which are fitted over shaft 48 and secured to the shaft by set screws 78 and 80, respectively.

Figure 4:
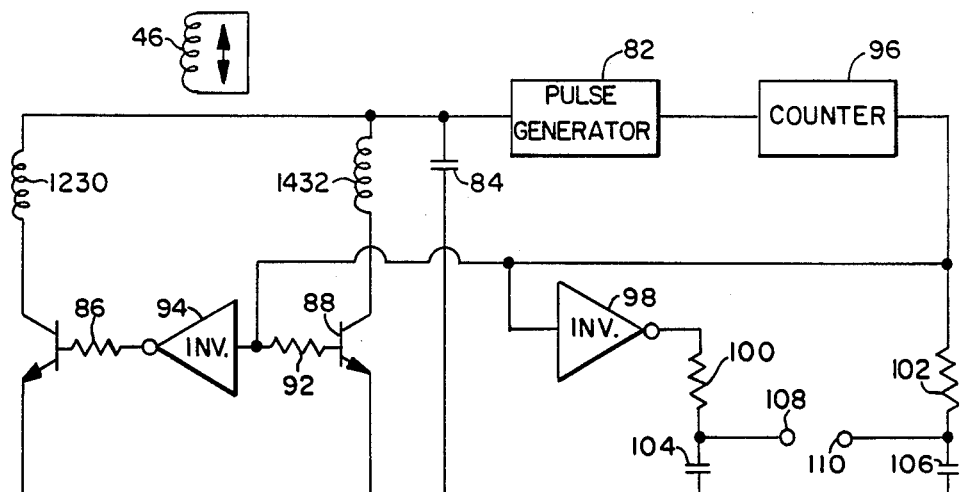
FIG. 4 is a circuit diagram showing how the inductance coil sensor of FIGS. 1 and 2 can be used.

FIG. 4 shows one circuit which may be used with the inductance coil sensor of FIGS. 1 and 2 to develop an indication of the position of the spoiler and, therefore, the parameter being monitored. The particular circuit shown in FIG. 4 uses multiplex signal processing techniques. The two coils 1230 and 1432 are switched, in timed alternating sequence, to the input of a pulse generator 82 which has a capacitor 84 connected between its input and ground. The switching of coils 1230 and 1432 is accomplished by a switching circuit composed of a pair of transistors 86 and 88 connected in series with coils 1230 and 1432, respectively, a pair of resistors 90 and 92, and an inverter 94.

Figure 5:
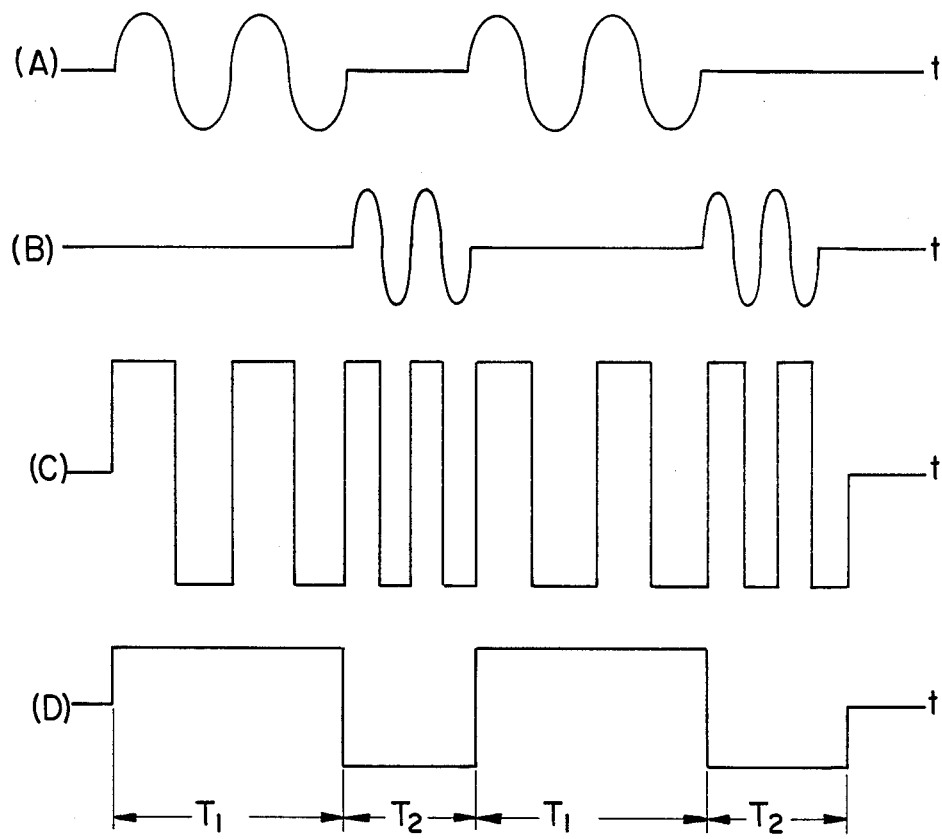
FIG. 5 is a series of waveform diagrams useful in understanding the operation of the FIG. 4 circuit.

At any particular time, the coil connected to pulse generator 82 forms a tank circuit with capacitor 84. Waveforms (A) and (B) of FIG. 5 represent, respectively, the two different resonant frequencies of the tank circuit formed by coil 1230 and capacitor 84 and the tank circuit formed by coil 1432 and capacitor 84. The higher frequency of waveform (B) represents the condition of spoiler 46 being more in the vicinity of coil 1432 than in the vicinity of coil 1230.

Waveform (C) represents the output of pulse generator 82. During those periods when coil 1230 is connected to pulse generator 82, the repetition rate of the output of the pulse generator corresponds to the resonant frequency of the tank circuit formed by coil 1230 and capacitor 84. During those periods when coil 1432 is connected to pulse generator 82, the repetition rate of the output of the pulse generator is higher and corresponds to the higher resonant frequency of the tank circuit formed by coil 1432 and capacitor 84.

The output of pulse generator 82 is supplied to a counter 96 which measures the amount of time required to count a specific number of pulses. For the example shown in FIG. 5, four pulses, two positive-going and two negative-going, are counted, and after the prescribed number of pulses have been counted, a new count is started. With the start of each new count, the output of counter 96 changes level to form pulses having durations corresponding to the time required to count the prescribed number of pulses. This is shown by waveform (D) in FIG. 5. The relative time durations of the counter pulses of waveform (D) provide an indication of the position of spoiler 46 relative to coils 1230 and 1432. The output of counter 96 also controls the operation of the switching circuit which switches the input of pulse generator 82 between coils 1230 and 1432.

An output indication, representative of the position of the spoiler, is developed by an inverter 98, a pair of resistors 100 and 102, and a pair of capacitors 104 and 106. The signal at a terminal 108 between resistor 100 and capacitor 104 has a value proportional to:

$$\frac{T_1}{T_1 + T_2}$$

where $T_1$ and $T_2$ are identified in FIG. 5, while the signal at a terminal 110 between resistor 102 and capacitor 106 has a value proportional to:

$$\frac{T_2}{T_1 + T_2}$$

The difference in the signals at terminals 108 and 110 is proportional to:

$$\frac{T_1 - T_2}{T_1 + T_2}$$

A change in position of spoiler 46 will change the resonant frequencies of the two tank circuits which, in turn, changes the repetition rates of the output of pulse generator 82. This causes a corresponding change in the values of $T_1$ and $T_2$ at the output of counter 96 and thereby changes the difference in the signals at terminals 108 and 110.

By locating parts of coils 1230 and 1432 both above and below spoiler 46, a compensation is provided for movements of the spoiler along the axis of mounting shaft 48. As the spoiler undergoes such movements, whereby it approaches or moves away from one part of the coil and produces in that part of the coil a particular effect due to such movements, an opposite effect is produced in the series-connected other part of the coil disposed on the other side of the spoiler. Consequently, great accuracy can be achieved by an inductance coil sensor, constructed in accordance with the present invention, despite undesired movements of the spoiler which do not represent changes in the parameter being monitored.

In addition, by locating part of each coil both above and below the spoiler, less than half of a single coil is required for each part of the coil. Because of the effect of mutual inductance between the two parts of each coil, the total number of turns required for a two-part coil, arranged according to the present invention, is less than the total number of turns required for a one-part coil.

Moreover, by locating part of each coil both above and below the spoiler, the present invention can provide a more linear output-signal versus spoiler-position function than would otherwise be provided by a sensor arrangement having a coil part on only one side of the spoiler. With a single coil part, a system using the signal processing technique described above is more sensitive to coil shape design and manufacturing tolerances.

The foregoing has set forth an exemplary and preferred embodiment of the present invention. It will be understood, however, that various alternatives will occur to those of ordinary skill in the art without departure from the spirit or scope of the present invention.

What is claimed:

1. An inductance coil sensor comprising:
   a first insulating board;
   first and second planar metal coils attached to said first insulating board and not connected in series;
   a second insulating board disposed parallel to said first insulating board;
   third and fourth planar metal coils attached to said second insulating board and not connected in series, and third planar metal coil identical to and aligned with said first planar metal coil and said fourth planar metal coil identical to and aligned with said second planar metal coil;
   means for connecting said first and said third planar metal coils in series to form a first inductance coil and for connecting said second and said fourth planar metal coils in series to form a second inductance coil;
   a planar metal member disposed parallel to and between said first and said second insulating boards and rotatable in its plane about an axis perpendicular to its plane, said planar metal member having an edge defined by a first straight-line segment which extends across said first and said third planar metal coils and a second straight-line segment which extends across said second and said fourth planar metal coils;
   and means for rotating said planar metal member in its plane and about said axis into and out of the vicinity of said planar metal coils in accordance with changes in a parameter being monitored to change the inductances of said first and said second inductance coils.

2. An inductance coil sensor according to claim 1 wherein said first and said second planar metal coils are disposed symmetrically about said axis and said third and said fourth planar metal coils are disposed symmetrically about said axis.

3. An inductance coil sensor according to claim 2 wherein said planar metal coils are circular segments each having an angular extent relative to said axis of not more than 180°.

4. An inductance coil sensor according to claim 3 wherein said circular segments are semicircular.

5. An inducatance coil sensor according to claim 4 wherein said straight-line segments of said planar metal member are aligned.

6. Sensor apparatus according to claim 5 wherein one part of each of said planar metal coils is on the top surface of its insulating board and a second part of each of said planar metal coils is on the bottom surface of its insulating board.

7. Sensor apparatus according to claim 5 wherein said rotatating means include a shaft upon which said rotatable planar metal member is mounted perpendicular to the axis of said shaft and which is adapted for attachment to a rotating part.

8. Sensor apparatus according to claim 7 wherein said rotatable planar metal member is a solid part.

9. An inductance coil sensor according to claim 5 wherein said rotatable planar metal member has a generally semi-circular shape.

10. An inductance coil sensor according to claim 9 wherein said rotatable planar metal member is a solid part.

11. An inductance coil sensor according to claim 2 wherein said parts of said first and said second planar metal coils on said top surface of said first insulating board are adjacent one another symmetrically about said axis to form a generally circular shape, said parts of said first and said second planar metal coils on said bottom surface of said first insulating board are adjacent one another symmetrically about said axis to form a generally circular shape, said parts of said third and said fourth planar metal coils on said top surface of said second insulating board are adjacent one another symmetrically about said axis to form a generally circular shape, and said parts of said third and said fourth planar metal coils on said bottom surface of said second insulating board are adjacent one another symmetrically about said axis to form a generally circular shape.

12. Sensor apparatus comprising:
   a first insulating board;
   first and second planar metal coils attached to said first insulating board and not connected in series;
   a second insulating board disposed parallel to said first insulating board;
   third and fourth planar metal coils attached to said second insulating board and not connected in series, said third planar metal coil identical to and aligned with said first planar metal coil and said fourth planar metal coil identical to and aligned with said second planar metal coil;
   means for connecting said first and said third planar metal coils in series to form a first inductance coil and for connecting said second and said fourth planar metal coils in series to form a second inductance coil;

a planar metal member disposed parallel to and between said first and said second insulating boards and rotatable in its plane about an axis perpendicular to its plane, said planar metal member having an edge defined by a first straight-line segment which extends across said first and said third planar metal coils and a second straight-line segment which extends across said second and said fourth planar metal coils;

means for rotating said planar metal member in its plane and about said axis into and out of the vicinity of said planar metal coils in accordance with changes in a parameter being monitored to change the inductances of said first and said second inductance coils;

and circuit means responsive to changes in the inductances of said first and said second inductance coils for developing indications of changes in the parameter being monitored.

13. Sensor apparatus according to claim 12 further including switching means for connecting said first and said second inductance coils to said circuit means in timed alternating sequence.

14. Sensor apparatus according to claim 13 wherein one part of each of said planar metal coils is on the top surface of its insulating board and a second part of each of said planar metal coils is on the bottom surface of its insulating board.

15. Sensor apparatus according to claim 14 wherein said rotatable planar metal member has a generally semi-circular shape.

16. Sensor apparatus according to claim 13 wherein said rotating means include a shaft extending along said axis perpendicular to the plane of said rotatable planar metal member and adapted for attachment to a rotating part.

17. Sensor apparatus according to claim 16 wherein said rotatable planar metal member is a solid part.

18. Sensor apparatus according to claim 13 wherein said first and said second planar metal coils are disposed symmetrically about said axis and said third and said fourth planar metal coils are disposed symmetrically about said axis.

19. Sensor apparatus according to claim 18 wherein said planar metal coils are circular segments each having an angular extend relative to said axis of not more than 180°.

20. Sensor apparatus according to claim 19 wherein said circular segments are semicircular.

21. Sensor apparatus according to claim 20 wherein said straight-line segments of said planar metal member are aligned.

22. Sensor apparatus according to claim 12 wherein said circuit means include:

a. means connected to said first and said second inductance coils for developing a first repetitive signal having a repetition rate which varies with changes in the inductance of said first inductance coil and a second repetitive signal having a repetition rate which varies with changes in the inductance of said second inductance coil, and b. means responsive to said first and said second repetitive signals for developing a first output signal proportional to the time period of said first repetitive signal and a second output signal proportional to the time period of said second repetitive signal.

* * * * *